(12) United States Patent
Nakamura et al.

(10) Patent No.: US 12,539,961 B2
(45) Date of Patent: Feb. 3, 2026

(54) HELICOPTER

(71) Applicant: SUBARU CORPORATION, Tokyo (JP)

(72) Inventors: Mizuki Nakamura, Tokyo (JP); Shuzou Hakuta, Tokyo (JP); Hirotoshi Tsukamoto, Tokyo (JP); Masafumi Sasaki, Tokyo (JP); Ryusuke Sakamoto, Tokyo (JP); Takumi Shinotsuka, Tokyo (JP); Mitsunori Fukudome, Tokyo (JP); Hiroshi Nagai, Tokyo (JP); Hiroshi Taguchi, Tokyo (JP); Toshihiro Yokoyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/398,679

(22) Filed: Dec. 28, 2023

(65) Prior Publication Data
US 2024/0253776 A1 Aug. 1, 2024

(30) Foreign Application Priority Data
Jan. 26, 2023 (JP) .................. 2023-010561

(51) Int. Cl.
*B64C 27/12* (2006.01)
*B64C 27/82* (2006.01)

(52) U.S. Cl.
CPC .............. *B64C 27/12* (2013.01); *B64C 27/82* (2013.01); *B64C 2027/8263* (2013.01)

(58) Field of Classification Search
CPC ............ B64C 27/82; B64C 2027/8209; B64C 2027/8218; B64C 2027/8236;
(Continued)

(56) References Cited

U.S. PATENT DOCUMENTS 2,626,766 A * 1/1953 Mcdonald ............... B64C 27/39
244/17.11
2,862,361 A * 12/1958 Koup ..................... B64D 35/00
60/365

(Continued)

FOREIGN PATENT DOCUMENTS

EP 0099185 B1 5/1987
EP 3842337 A1 6/2021
(Continued)

OTHER PUBLICATIONS

Extended European Search Report, dated Jun. 13, 2024 in European Patent Application 24153904.8-1004 (In English).
(Continued)

*Primary Examiner* — Joshua J Michener
*Assistant Examiner* — Michael B. Kreiner
(74) *Attorney, Agent, or Firm* — MCGINN IP LAW GROUP PLLC (57) ABSTRACT

A vertical tail of a helicopter has a leading edge and a trailing edge concave toward the leading edge. The helicopter includes a main rotor and a tail rotor for generating anti-torque to cancel torque generated by rotation of the main rotor. The trailing edge is concave within a range within which the vertical tail overlaps a circular region, formed as a rotation range of the tail rotor, in a rotation axis direction of the tail rotor.

20 Claims, 8 Drawing Sheets

(58) Field of Classification Search
CPC .... B64C 2027/8263; B64C 2027/8272; B64C 2027/8281; B64C 23/06; B64C 21/10; B64C 2230/26
See application file for complete search history.

(56) References Cited

U.S. PATENT DOCUMENTS

| | | | | |
|---|---|---|---|---|
| 3,463,418 | A * | 8/1969 | Miksch | B64C 23/06 244/17.11 |
| 4,591,113 | A | 5/1986 | Mabey | |
| 5,209,430 | A * | 5/1993 | Wilson | B64C 23/00 244/17.11 |
| D425,853 | S * | 5/2000 | Caporaletti | D12/327 |
| 6,869,045 | B1 * | 3/2005 | Desroche | B64C 27/82 244/17.11 |
| 7,434,764 | B2 * | 10/2008 | Lappos | B64C 27/14 244/17.11 |
| 8,827,201 | B2 * | 9/2014 | Alfano | B64C 21/10 244/17.11 |
| 8,985,500 | B2 * | 3/2015 | Borie | B64C 27/82 244/45 R |
| 8,985,503 | B2 * | 3/2015 | Desroche | B64C 23/06 244/17.11 |
| 8,991,747 | B2 | 3/2015 | Desroche | |
| 9,090,326 | B2 * | 7/2015 | Whalen | B64C 23/005 |
| 9,475,578 | B2 * | 10/2016 | Mores | B64C 27/82 |
| 9,725,167 | B2 * | 8/2017 | Nagasaki | B64U 10/10 |
| 10,543,908 | B2 * | 1/2020 | Stefes | B64C 13/16 |
| 10,611,460 | B2 * | 4/2020 | Lanigan | B64C 5/02 |
| 10,967,958 | B2 * | 4/2021 | Stefes | B64C 13/36 |
| 11,027,828 | B2 * | 6/2021 | Stefes | B64C 23/06 |
| 11,072,422 | B2 * | 7/2021 | Sinusas | B64C 5/12 |
| 11,708,868 | B2 * | 7/2023 | Olson | B64C 27/14 192/85.01 |
| 11,780,575 | B2 * | 10/2023 | Brunetti | B64C 27/14 244/17.19 |
| 12,049,304 | B2 * | 7/2024 | Olson | B64C 27/12 |
| 2005/0279879 | A1 * | 12/2005 | Desroche | B64C 27/82 244/17.11 |
| 2012/0138731 | A1 | 6/2012 | Alfano | |
| 2012/0256041 | A1 | 10/2012 | Desroche | |
| 2018/0327079 | A1 | 11/2018 | Lanigan et al. | |
| 2020/0385112 | A1 | 12/2020 | Brunetti et al. | |
| 2022/0025941 | A1 | 1/2022 | Olson et al. | |
| 2023/0174219 | A1 * | 6/2023 | Melone | B64C 39/066 244/119 |

FOREIGN PATENT DOCUMENTS

| | | | |
|---|---|---|---|
| JP | 59-227595 A1 | 12/1984 | |
| JP | H 04-050099 A | 2/1992 | |
| JP | H 11-286300 A | 10/1999 | |
| JP | 2016-506335 A | 3/2016 | |
| RU | 2281226 C1 | 8/2006 | |
| WO | WO-2021130692 A1 * | 7/2021 | ............. B64C 27/82 |

OTHER PUBLICATIONS

European Office Action, dated Aug. 28, 2025 in European Application No. 24153904.8.

* cited by examiner

HELICOPTER

CROSS REFERENCES TO RELATED APPLICATIONS

This application is based upon and claims the benefit of priority from Japanese Patent Application No. 2023-010561, filed on Jan. 26, 2023; the entire contents of which are incorporated herein by reference.

FIELD

Implementations described herein relate generally to a helicopter, a vertical tail of a helicopter, a method of repairing a vertical tail of a helicopter and a method of improving anti-torque by a tail rotor of a helicopter.

BACKGROUND

In a helicopter, the rotation of the main rotor generates torque in the direction opposite to the rotational direction of the main rotor. In order to counteract this torque, a general helicopter has a tail rotor, which generates anti-torque (for example, refer to Japanese Patent Application Publication JP H04-050099 A, Japanese Patent Application Publication JP H11-286300 A and Japanese Patent Application Publication JP 2016-506335 A). A typical tail rotor is attached to a tail boom formed at the rear end portion of a helicopter fuselage or a vertical tail coupled to the tail boom. Examples of a tail rotor include a general rotor whose blades are exposed and not protected similarly to the main rotor, as well as a ducted fan whose blades are protected by a duct.

An object of the present invention is to reduce energy required to generate anti-torque by a tail rotor of a helicopter.

SUMMARY

In general, according to one implementation, a vertical tail of a helicopter has a leading edge and a trailing edge concave toward the leading edge. The helicopter includes a main rotor and a tail rotor for generating anti-torque to cancel torque generated by rotation of the main rotor. The trailing edge is concave within a range within which the vertical tail overlaps a circular region, formed as a rotation range of the tail rotor, in a rotation axis direction of the tail rotor.

Further, according to one implementation, a vertical tail of a helicopter has a leading edge, a trailing edge concave toward the leading edge, and spoilers attached to a left side and a right side of the vertical tail respectively. The helicopter includes a main rotor and a tail rotor for generating anti-torque to cancel torque generated by rotation of the main rotor. The spoilers suppress generation of vortices around the concave trailing edge by separating airflow on left and right surfaces of the vertical tail respectively. The concave trailing edge has a cover made of a flat plate. The flat plate is disposed not so as to protrude from the concave trailing edge.

Further, according to one implementation, a helicopter includes the above-mentioned vertical tail.

Further, according to one implementation, a method of repairing a vertical tail of a helicopter includes: cutting out at least a part, on a trailing edge side, of the vertical tail toward a leading edge side; and occluding an opening, formed on the trailing edge side of the vertical tail after cutting out the part, by attaching a cover made of a flat plate to the opening.

Further, according to one implementation, a method of improving anti-torque by a tail rotor of a helicopter, having a main rotor, the tail rotor and a vertical tail, includes: improving the anti-torque by decreasing an area of the vertical tail that blocks a jet flow generated from the tail rotor in a rotation axis direction of the tail rotor. The tail rotor is for generating the anti-torque to cancel torque generated by rotation of the main rotor. The vertical tail has a leading edge and a trailing edge. The tail rotor is attached to a distal portion of the vertical tail. The area is decreased by making the trailing edge have a shape cut out so as to be concave only within a range within which the vertical tail overlaps a circular region, formed as a rotation range of the tail rotor, in the rotation axis direction of the tail rotor. The trailing edge is concave toward the leading edge.

DETAILED DESCRIPTION

A helicopter, a vertical tail of a helicopter, a method of repairing a vertical tail of a helicopter and a method of improving anti-torque by a tail rotor of a helicopter according to implementations of the present invention will be described with reference to the accompanying drawings.

(First Implementation)
(Structure and Function of Helicopter and Vertical Tail)

Figure 1:
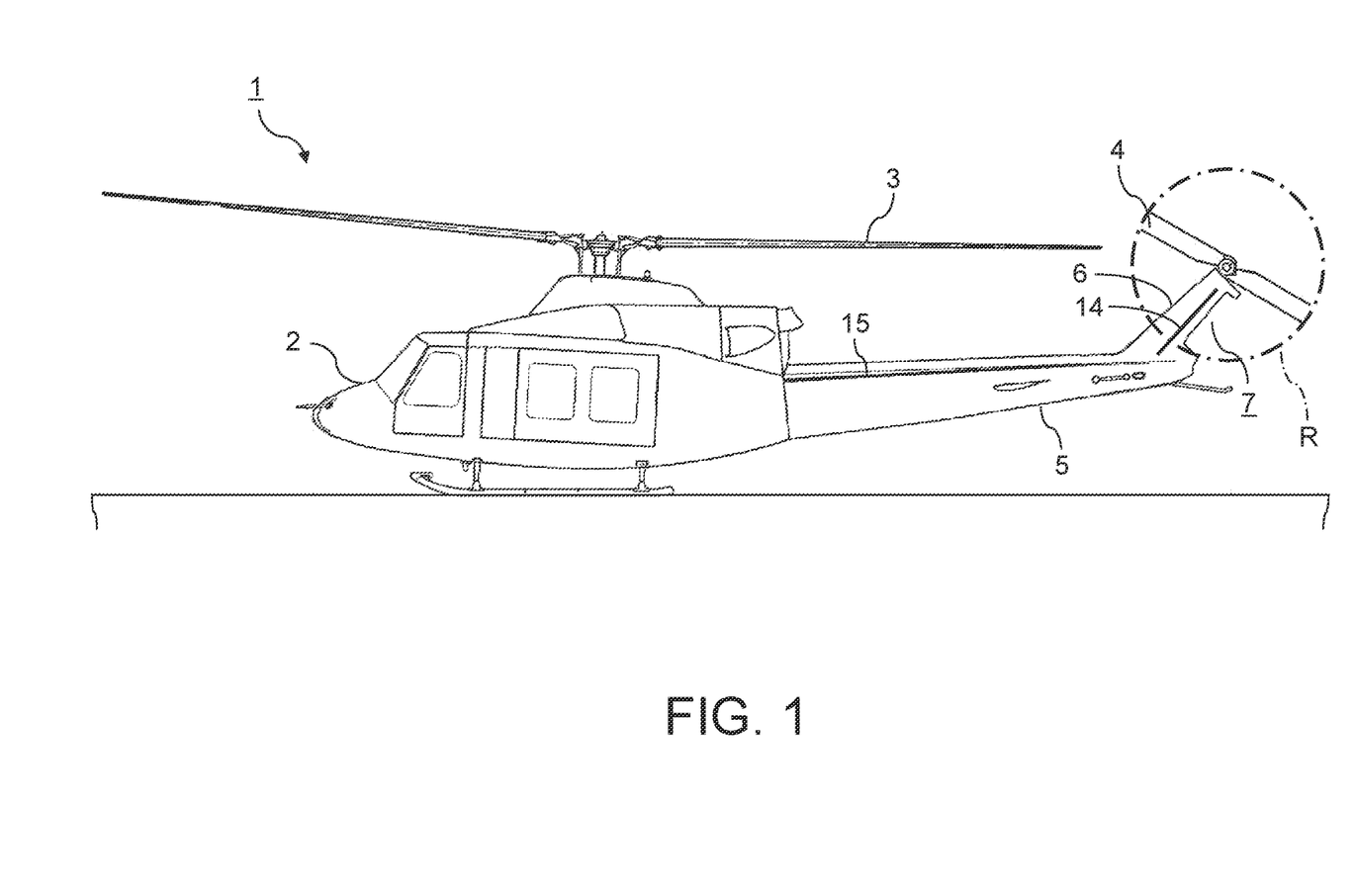
FIG. 1 is a front view showing structure of a helicopter according to the first implementation of the present invention.

FIG. 1 is a front view showing structure of a helicopter according to the first implementation of the present invention.

A helicopter 1 has a fuselage 2, a main rotor 3 and a tail rotor 4. A tail boom 5 is formed on the rear end side of the fuselage 2 and becomes gradually elongated toward the rear end. A vertical tail 6 is integrated at the rear end portion of the tail boom 5. The main rotor 3 is coupled to an upper portion of the fuselage 2. Meanwhile, the tail rotor 4 is coupled to a tip portion of the vertical tail 6.

The main rotor 3 is a rotor for generating lift. On the other hand, the tail rotor 4 is a rotor for generating anti-torque to cancel the torque generated by the rotation of the main rotor 3. In a case of the typical helicopter 1 in which the main rotor 3 rotates counterclockwise, the rotation of the main rotor 3 generates torque in the vertical tail 6 of the helicopter 1 in the left side direction.

Accordingly, the anti-torque for canceling the torque by the main rotor 3 needs to be generated in the right side direction of the vertical tail 6. Therefore the tail rotor 4 is attached to the right side of the vertical tail 6. A jet flow called side wash is generated on the lateral side of the helicopter 1 by the rotation of the tail rotor 4, and thereby thrust force called tail rotor thrust is generated in the right side direction. Consequently, the torque due to the main rotor 3 is canceled by the tail rotor thrust toward the right side.

When the helicopter 1 is moved laterally toward the right side, the tail rotor thrust which should be generated by the tail rotor 4 becomes the maximum since the tail rotor 4 is required to generate thrust in the right side direction not only to cancel the torque due to the main rotor 3 but also to move the helicopter 1 toward the right side. Conversely, when the helicopter 1 is moved laterally toward the left side, the tail rotor thrust which should be generated by the tail rotor 4 becomes the minimum. In any case, improving the anti-torque generated by the rotation of the tail rotor 4, i.e., the tail rotor thrust allows reduction in the energy required to rotate the tail rotor 4.

When the tail rotor 4 is attached to the right side of the vertical tail 6, a part of the side wash generated by the rotation of the tail rotor 4 is inevitably blocked by the vertical tail 6. Thereby, the tail rotor thrust is reduced. That is, the tail rotor thrust is reduced due to interference between the side wash generated by the rotation of the tail rotor 4 and the vertical tail 6.

Accordingly, a notch 7 is formed on the trailing edge side of the vertical tail 6 of the helicopter 1. That is, the trailing edge of the vertical tail 6 is recessed toward the leading edge of the vertical tail 6. In this case, it is preferable that the trailing edge of the vertical tail 6 is concave toward the leading edge side of the vertical tail 6 within a range within which the vertical tail 6 overlaps a circular region R, formed as the rotation range of the tail rotor 4, in the rotation axis direction of the tail rotor 4, from the viewpoint of minimizing the amount of decrease in the area of the vertical tail 6 in order to stabilize the airframe.

Figure 2:
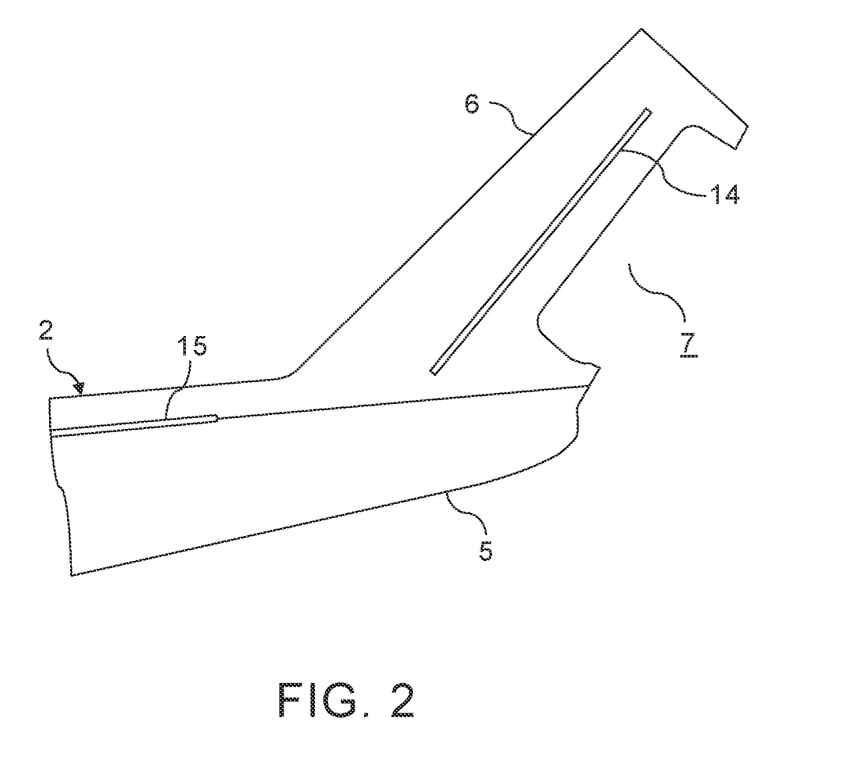
FIG. 2 is an enlarged partial front view showing structure of a part of the tail boom and the vertical tail shown in FIG. 1.
Figure 3:
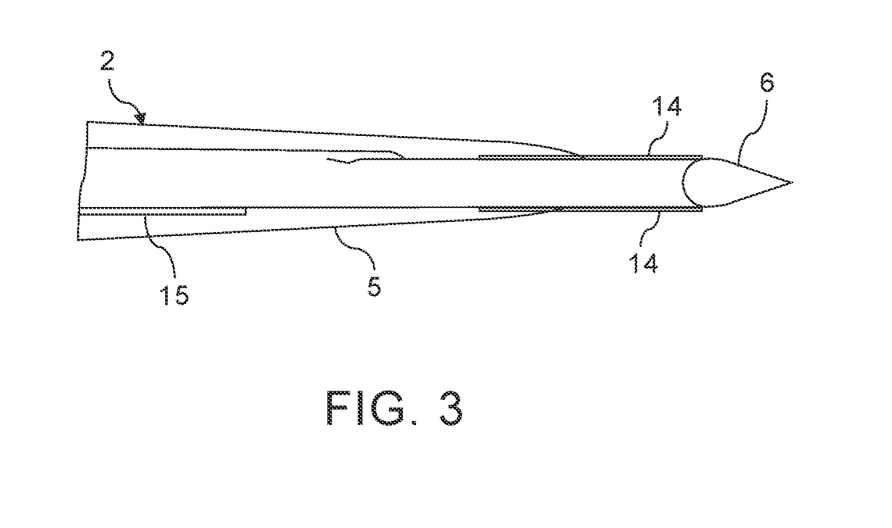
FIG. 3 is a plan view of the part of the tail boom and the vertical tail shown in FIG. 2.
Figure 4:
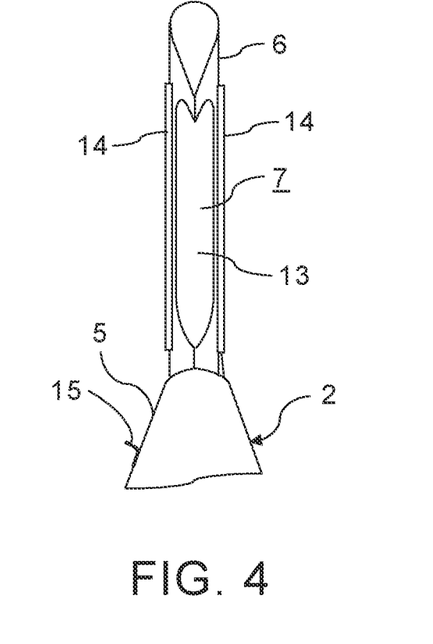
FIG. 4 is a right side view of the part of the tail boom and the vertical tail shown in FIG. 2.
Figure 5:
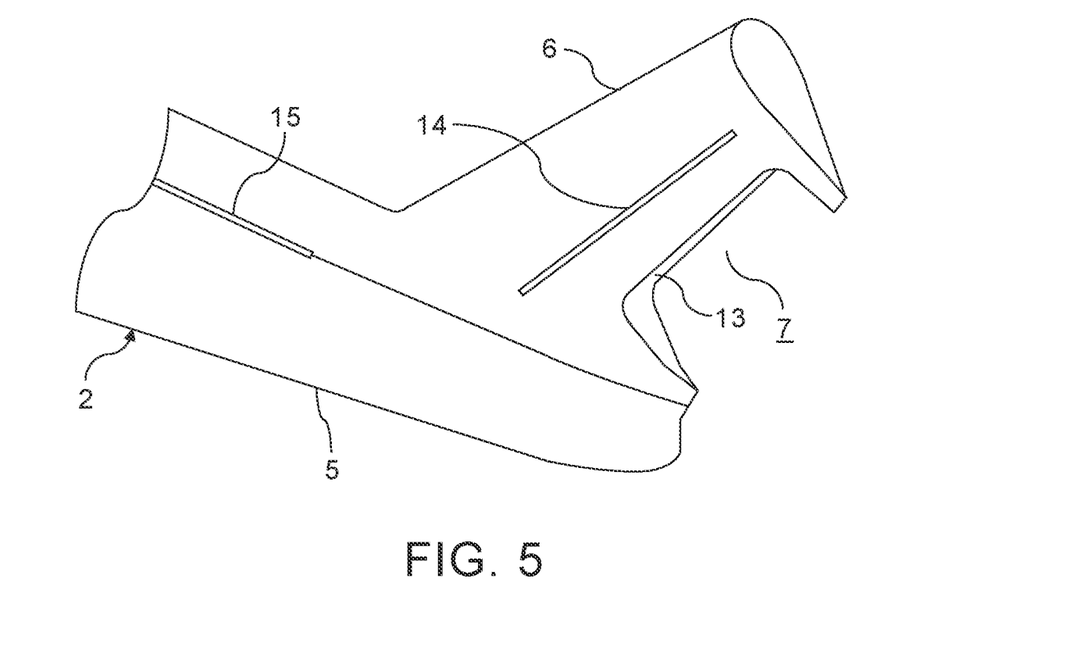
FIG. 5 is a perspective view of the part of the tail boom and the vertical tail shown in FIG. 2.

FIG. 2 is an enlarged partial front view showing structure of a part of the tail boom 5 and the vertical tail 6 shown in FIG. 1. FIG. 3 is a plan view of the part of the tail boom 5 and the vertical tail 6 shown in FIG. 2. FIG. 4 is a right side view of the part of the tail boom 5 and the vertical tail 6 shown in FIG. 2. FIG. 5 is a perspective view of the part of the tail boom 5 and the vertical tail 6 shown in FIG. 2.

Forming the notch 7 as illustrated in FIG. 2 to FIG. 5 in the trailing edge of the vertical tail 6 allows reducing the area of interference between the vertical tail 6 and the side wash generated by the rotation of the tail rotor 4. As a result, the amount of decrease in tail rotor thrust due to the shielding by the vertical tail 6 can also be reduced. In other words, the anti-torque of the tail rotor 4 can be improved by reducing the area of the vertical tail 6 that blocks the side wash generated from the tail rotor 4 in the rotation axis direction of the tail rotor 4. As a result, the energy required to rotate the tail rotor 4 to generate anti-torque can be reduced.

On the other hand, the vertical tail 6 plays the role of reducing the left and right shaking of the helicopter 1 to ensure the stability of the airframe. Therefore, the wider the range of the notch 7 is, the lower the stability of the airframe becomes. If the range of the notch 7 is excessive, it becomes necessary to form a protrusion, having a shape to ensure the stability of the airframe, at the rear end portion of the tail boom 5 in order to compensate for the decrease in the stability of the airframe.

Accordingly, it is desirable to limit the range of the notch 7 to only within the range that overlaps the circular region R, which is the rotation range of the tail rotor 4, in the direction of the rotation axis of the tail rotor 4. In other words, it is preferable to make only a portion of the trailing edge of the vertical tail 6 within the range that overlaps the circular area R, formed as the rotation range of the tail rotor 4, in the rotational axis direction of the tail rotor 4 have a shape that is concave and cut away on the leading edge side of the vertical tail 6.

When the notch 7 for improving the anti-torque generated by the tail rotor 4 is formed in the vertical tail 6 in a limited manner, it is possible to minimize the amount of reduction in the area of the vertical tail 6 and thereby secure the area of the vertical tail 6 necessary to stabilize the airframe, as described above. As a result, it is possible to eliminate the need for a tail boom having an appropriate shape which protrudes on the rear end side from the vertical tail 6 in order to stabilize the airframe, as illustrated.

If the depth of the notch 7 is excessive, the mechanical strength of the vertical tail 6 that supports the tail rotor 4 while withstanding the tail rotor thrust becomes insufficient. Therefore, the depth of the notch 7 is determined so as to ensure the mechanical strength of the vertical tail 6 that supports the tail rotor 4 while withstanding the tail rotor thrust.

The vertical tail 6 typically has structure in which skins are reinforced with reinforcing members including spars and ribs, and therefore the mechanical strength of the vertical tail 6 is mainly provided by the main reinforcing members. That is, the skins included in the vertical tail 6 hardly contributes to the mechanical strength of the vertical tail 6 for supporting the tail rotor 4, and it is not important to ensure the width of the vertical tail 6 itself. Rather, it is important to dispose the main reinforcing members, which are dominant in the mechanical strength of the vertical tail 6, at appropriate positions without omitting them in order to ensure the mechanical strength of the vertical tail 6. Accordingly, the depth of the notch 7 can be determined so that the notch 7 may not interfere with reinforcing members including spars determined by strength calculation.

Figure 6:
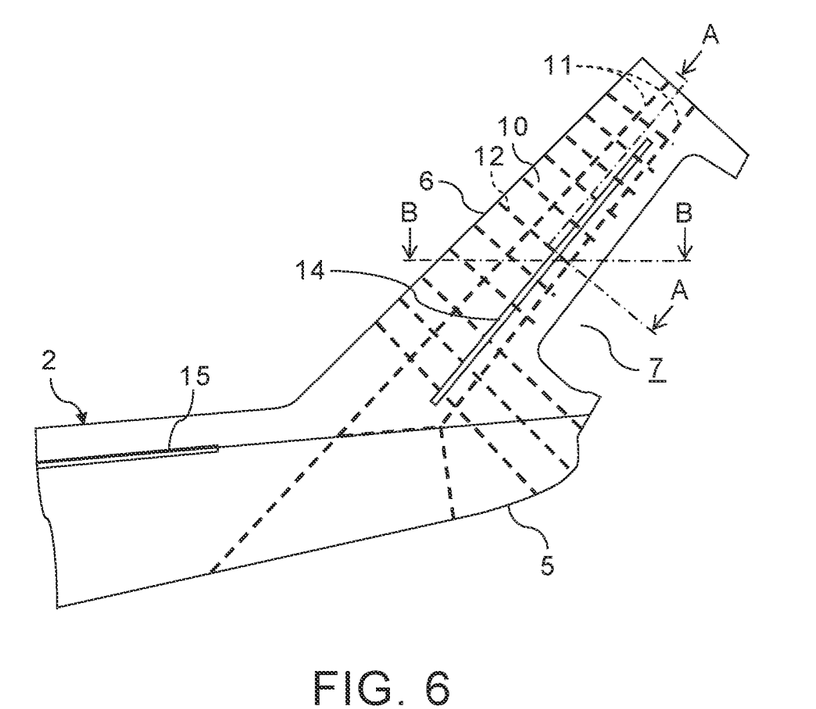
FIG. 6 shows an example of arrangement of main reinforcing members included in the vertical tail shown in FIG. 2.
Figure 7:
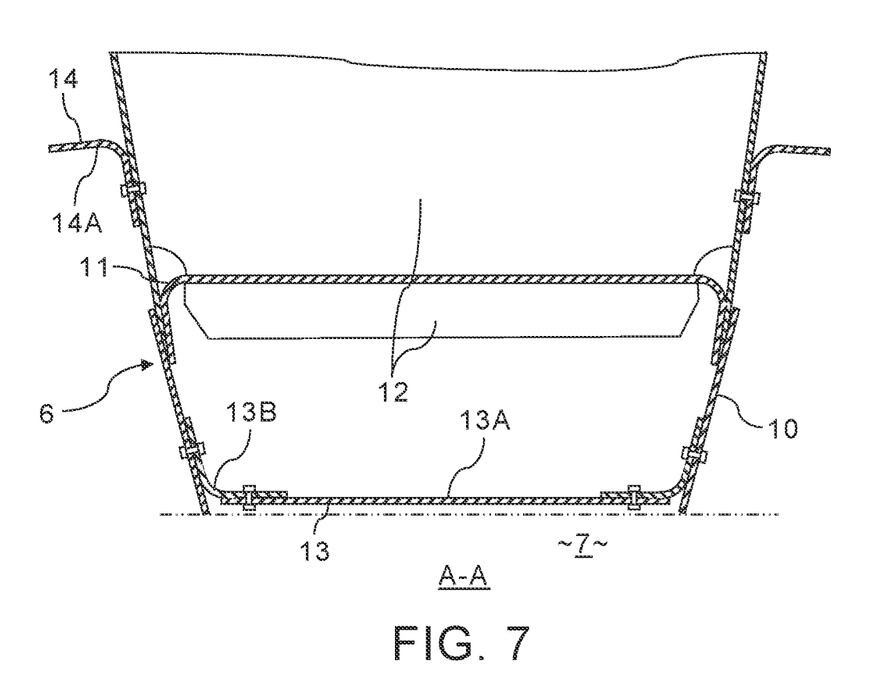
FIG. 7 is an enlarged sectional view of the vertical tail shown in FIG. 6 at the position A-A.

FIG. 6 shows an example of arrangement of main reinforcing members included in the vertical tail 6 shown in FIG. 2. FIG. 7 is an enlarged sectional view of the vertical tail 6 shown in FIG. 6 at the position A-A.

The vertical tail 6 shown in FIG. 2 can have a box structure in which left and right skins 10 are reinforced with spars 11 and ribs 12, similarly to a typical vertical tail. More specifically, the structure of the vertical tail 6 can be designed so that each of the length directions of the spars 11 may be approximately the length direction of the vertical tail 6 while each of the length directions of the ribs 12 may be approximately perpendicular to the spars 11.

Accordingly, a cover 13 forming the trailing edge, which is recessed by the notch 7, of the vertical tail 6 can be placed at a position away from the spar 11 on the trailing edge side of the vertical tail 6 by a certain distance so that the cover 13 may not interfere with the spar 11 on the trailing edge side of the vertical tail 6. In this way, the depth of the notch 7 can be determined. That is, a desirable condition from the viewpoint of improving the anti-torque generated by the tail rotor 4 is to make the notch 7 as deep as possible as long as the notch 7 does not interfere with reinforcing members, such as the spars 11, necessary to ensure the mechanical strength of the vertical tail 6.

On the other hand, the ribs 12 are disposed from the leading edge side of the vertical tail 6 to the trailing edge side in many cases. In the illustrated example, some of the ribs 12 are designed to have short lengths which can ensure strength so that the cover 13, on the trailing edge side, that forms the notch 7 of the vertical tail 6 may not interfere with the ribs 12. That is, the ribs 12 near the notch 7 of the vertical tail 6 are shortened so as not to reach the cover 13 forming the trailing edge. As a result, each rib 12 between the spar 11 on the trailing edge side and the cover 13 forming the trailing edge has a shape of a typical rib cut away as shown in the example shown in FIG. 7 unlike a shape of each rib 12 on the leading edge side of the spar 11 on the trailing edge side.

As a matter of course, the ribs 12 are not limited to the example shown in FIG. 6 and FIG. 7. For example, the ribs 12 that would cross the notch 7 if the ribs 12 were stretched in the length directions may reach the cover 13 forming the trailing edge. Nevertheless, when the ribs 12 that would cross the notch 7 if the ribs 12 were stretched in the length directions are made to have such lengths that the ribs 12 may not reach the cover 13 forming the trailing edge as illustrated in FIG. 6 and FIG. 7, it becomes easy to modify a vertical tail of an existing helicopter without the notch 7 to the vertical tail 6 having the notch 7 as illustrated.

More specifically, the notch 7 can be formed in the vertical tail 6 by cutting the ribs 12 on the trailing edge side of the vertical tail 6 so that the ribs 12 each having a length necessary to ensure the strength of the vertical tail 6 may remain, trimming the left and right skins 10, and attaching the cover 13 forming the trailing edge. Accordingly, even in case of an existing vertical tail, the anti-torque generated by the tail rotor 4 can be improved by newly forming the notch 7. Conversely, when the helicopter 1 is newly designed and produced, the ribs 12 may reach the cover 13 on the trailing edge side forming the notch 7, similarly to a typical vertical tail without the notch 7, as described above.

It is preferable to attach spoilers 14 to the vertical tail 6 in addition to forming the notch 7, as illustrated. More specifically, it is preferable to attach the spoiler 14, which separates airflow on a surface of the vertical tail 6, on both left and right sides of the vertical tail 6 in order to suppress the generation of vortices on the trailing edge side of the vertical tail 6, which is recessed by the notch 7.

The spoiler 14 whose purpose is to separate airflow on a surface of the vertical tail 6 can be composed of an upright plate disposed so that the airflow on the surface of the vertical tail 6 may traverse. In the example shown in FIG. 7, each spoiler 14 is composed of an angle member 14A whose one side serves as an upright plate that stands out from the surface of the vertical tail 6, by coupling the other side to the surface of the vertical tail 6 so that the length direction of the angle member 14A generally follows the trailing edge of the vertical tail 6. Each angle member 14A serving as the spoiler 14 may be made of a desired material, such as aluminum, as well as steel. When the spoiler 14 is composed of the angle member 14A, the angle member 14A can be fixed to the surface of the vertical tail 6 with fasteners. As a matter of course, an adhesive may also be used together with the fasteners.

In order to suppress vortices on the trailing edge side of the vertical tail 6, it is appropriate to dispose the spoilers 14 at positions, on both left and right sides of the vertical tail 6, away from the trailing edge of the vertical tail 6 by appropriate distances respectively as well as to make the height of each spoiler 14 lower than the thickness of the boundary layer formed on the surface of the vertical tail 6. That is, it is appropriate to determine the position and height of each spoiler 14 so that the airflows on the surfaces on both left and right sides of the vertical tail 6 may be separated by the spoilers 14 respectively before reaching the trailing edge. Thereby, the airflow separated by each spoiler 14 mixes with a uniform flow before reaching the trailing edge of the vertical tail 6, and the velocity gradient of the airflow can be made gentle near the trailing edge of the vertical tail 6.

Figure 8:
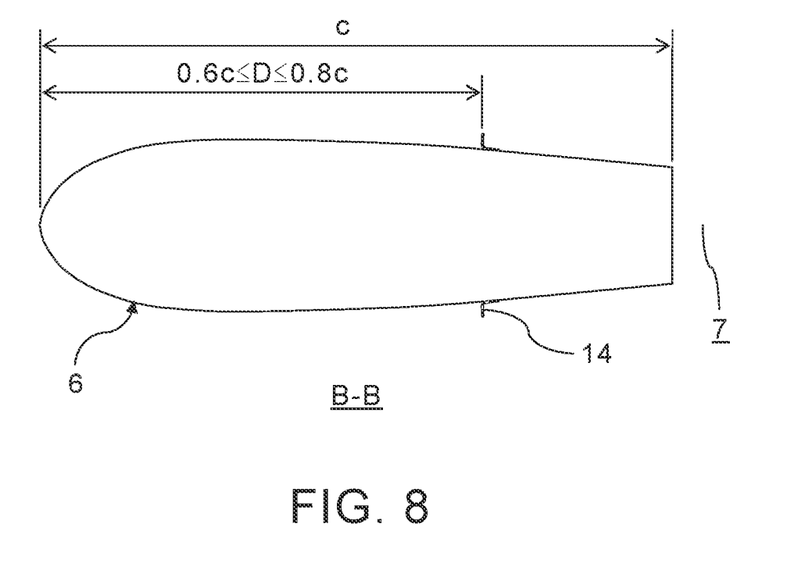
FIG. 8 is an enlarged sectional view of only the outline of the vertical tail shown in FIG. 6 at the position B-B for explaining the method of determining the positions of the spoilers.

FIG. 8 is an enlarged sectional view of only the outline of the vertical tail 6 shown in FIG. 6 at the position B-B for explaining the method of determining the positions of the spoilers 14.

The positions of the spoilers 14 can be determined as positions where vortices can be sufficiently suppressed, by a computational fluid dynamics (CFD) analysis simulation, wind tunnel tests, or the like. As a result of an actual CFD analysis simulation, it was confirmed that a preferred condition for the position of each spoiler 14 in order to suppress vortices on the trailing edge side of the vertical tail 6 was to dispose each spoiler 14 at a position away from the leading edge of the vertical tail 6 by a distance D not less than 60% and not more than 80% of a representative length c of the vertical tail 6 as shown in FIG. 8 when the representative length c was defined as the length of the vertical tail 6 at the position B-B of the mean aerodynamic chord (MAC) which was horizontal to the body axis of the helicopter 1.

On the other hand, the thickness of the boundary layer necessary to determine the height of the spoiler 14 can be obtained by a known calculation. As a result of a trial calculation, it is considered appropriate that the height of the spoiler 14 is made not less than 40% and not more than 60% of the thickness of the boundary layer.

When vortices on the trailing edge side of the vertical tail 6 are suppressed by the spoilers 14, the cover 13 forming the concave trailing edge of the vertical tail 6 can be made of a flat plate 13A. That is, in a case of a typical conventional vertical tail to which the spoilers 14 are not attached, it is realistic to curve the cover, forming the trailing edge of the vertical tail, into a convex shape so that the cross section of the cover has a wing-shaped since it is necessary to suppress vibration and the increase in air resistance due to vortices generated on the trailing edge side of the vertical tail when the helicopter moves forward.

On the other hand, in the case of the vertical tail 6 having the spoilers 14 for suppressing vortices on the trailing edge side of the vertical tail 6, vibration and an excessive increase in air resistance can be avoided during advancement of the helicopter 1 even when the cover 13 on the trailing edge side in the portion of the vertical tail 6 where the notch 7 is formed is the flat plate 13A since the generation of vortices is suppressed by the spoilers 14. When the cover 13 on the trailing edge side in the portion of the vertical tail 6 where the notch 7 is formed is composed of the flat plate 13A, it is possible to dispose the flat plate 13A so as not to protrude into the notch 7 on the concave trailing edge side of the vertical tail 6. As a result, the disadvantage that the effect of improving the anti-torque generated by the tail rotor 4 is reduced if the trailing edge side of the vertical tail 6 is closed up with a conventional typical convex cover since the depth of the notch 7 becomes shallower can be avoided.

In the example shown in FIG. 7, the flat plate 13A serving as the cover 13 on the trailing edge side of the portion of the vertical tail 6 where the notch 7 is formed is disposed to be shifted toward the leading edge side of the vertical tail 6 from the edges of the skins 10 on both sides that form the outline of the trailing edge of the vertical tail 6 in the portion where the notch 7 is formed. That is, the cover 13 on the trailing edge side of the portion of the vertical tail 6 where the notch 7 is formed is disposed so as to be inside the outline of the notch 7.

The interval between the left and right skins 10 of the vertical tail 6 becomes narrower toward the trailing edge. Accordingly, the flat plate 13A can be fixed to the inner surfaces of the left and right skins 10, e.g., using angle members 13B made of a desired material, such as aluminum, so that the flat plate 13A can be easily disposed and assembled between the left and right skins 10. In this way, composing the cover 13, on the trailing edge side of the vertical tail 6 in the portion where the notch 7 is formed, of the flat plate 13A and the angle members 13B allows closing up the trailing edge of the vertical tail 6 with the cover 13 without protruding the cover 13 on the trailing edge side of the vertical tail 6. When the flat plate 13A is fixed to the inner surfaces of the skins 10 with the angle members 13B, each angle member 13B can be fixed to the surfaces of the flat plate 13A and the skin 10 with fasteners. As a matter of course, an adhesive may also be used together with the fasteners.

Note that, the position of the outer surface of the flat plate 13A may be made to match the contour of the trailing edge of the vertical tail 6 at the portion where the notch 7 is formed although FIG. 7 shows an example where the position of the outer surface of the flat plate 13A is inside the contour of the trailing edge of the vertical tail 6 at the portion where the notch 7 is formed. Even when the edges of the skins 10 included in the vertical tail 6 protrude beyond the cover 13, composed of the flat plate 13A, on the trailing edge side as in the example shown in FIG. 7, negative effects, such as an increase in air resistance, on the stability of the helicopter 1 are negligible since the spoilers 14 suppress the generation of vortices not only near the edges of the skins 10 but also near the outer surface of the flat plate 13A.

The anti-torque generated by the tail rotor 4 can be improved not only by the above-mentioned structure of the vertical tail 6 but also by structure of the tail boom 5. Specifically, in the case of the helicopter 1 having the typical main rotor 3 whose rotation direction is counterclockwise, at least one strake 15 can be attached to the left side of the tail boom 5. The strake 15 is a fin that blocks the downwash from the main rotor 3.

When the downwash, flowing on the left side of the tail boom 5, from the main rotor 3 is obstructed by the strake 15 or the strakes 15, the pressure on the left side of the helicopter 1 can be made higher than the pressure on the right side of the helicopter 1. As a result, force is generated toward the right side of the helicopter 1, and this force toward the right side can be used as part of the anti-torque. Thereby, the energy required to rotate the tail rotor 4 to generate anti-torque can be further reduced. That is, the anti-torque of the helicopter 1 as a whole can be further improved.

The inflow angle of the downwash to the left side of the tail boom 5 changes depending on a speed of the helicopter 1 in the lateral movement direction. Specifically, as the helicopter 1 moves laterally to the right at a faster speed, the inflow angle of the downwash to the left side of the tail boom 5 becomes larger from the upper side toward the left side direction. Conversely, when the speed of the helicopter 1 in the lateral movement direction is zero, such as during hovering, the inflow angle of the downwash to the left side of the tail boom 5 becomes an angle from the upper side toward the right side direction.

Therefore, in order to receive the downwash flowing from the upper side toward the left side by the at least one strake 15 on the left side of the tail boom 5 to generate force toward the right side when the helicopter 1 moves laterally to the right and the anti-torque improvement is most desired, it is appropriate to dispose the strake 15 at least on the upper side on the left side of the tail boom 5, i.e., on the surface of the tail boom 5 that curves so as to be convex upward on the left side.

In addition, the strake 15 may also be disposed on the lower side on the left side of the tail boom 5, i.e., on the surface of the tail boom 5 that curves so as to be convex downward on the left side. In this case, downwash on the left side of the tail boom 5, which flows from the upper side toward the right side, can be received by the strake 15 on the lower side to generate force toward the right even when the speed of the lateral movement of the helicopter 1 is zero, such as during hovering.

Nevertheless, attaching the additional strake 15 not only increases the manufacturing cost of the helicopter 1 but also increases the weight of the helicopter 1. Therefore, when it is important to avoid increases in the manufacturing cost and weight of the helicopter 1, it is preferable to attach the strake 15 only on the upper side of the tail boom 5. Accordingly, in the illustrated example, the strake 15 is attached only to the upper side of the tail boom 5. Conversely, when it is important to improve anti-torque when the helicopter 1 is hovering or the like, it is preferable to attach the strake 15 to both the upper and lower sides of the tail boom 5.

Since the inflow angle of the downwash toward the left side of the tail boom 5 changes depending on the speed of the helicopter 1 in the lateral movement direction, as described above, the inflow angle of the downwash to the strake 15 also changes depending on the speed of the helicopter 1 in the lateral movement direction. Therefore, the magnitude of the force in the right direction, which is generated as a pressure difference between the left side and the right side by the strake 15 or the strakes 15, also changes depending on the speed of the helicopter 1 in the lateral movement direction.

When the magnitude of the force in the right direction generated by the strake 15 or the strakes 15 varies greatly, the operational burden on a pilot of the helicopter 1 increases since variation in the magnitude of the force in the right direction to be generated by the tail rotor 4 becomes large. Therefore, it is desirable that the amount of variation in the magnitude of the force in the right direction generated by the strake 15 or the strakes 15 be as small as possible even when a flight state of the helicopter 1 changes. It is a state where the helicopter 1 is hovering and a state where the helicopter 1 is flying laterally to the right among flight states of the helicopter 1 that the anti-torque improvement particularly contributes to.

Accordingly, at least one of the position, length and height of the strake 15 or each of the strakes 15 can be optimized so that the amount of variation in the force in the right direction generated by the strake 15 or the strakes 15 may become the minimum between a state where the helicopter 1 is hovering and a state where the helicopter 1 is flying laterally to the right. Thereby, in a case where a flight state of the helicopter 1 changes from a rightward flight, in which the energy required to rotate the tail rotor 4 becomes the maximum, to hovering, the amount of variation in the magnitude of the force in the right direction generated by the strake 15 or the strakes 15 can be reduced. As a result, an increase in operating burden on a pilot of the helicopter 1 due to the attachment of the strake 15 or the strakes 15 can be reduced.

Note that, the position, length and height of the strake 15 or each of the strakes 15 can be optimized by simulation including CFD analysis. It is considered that the height of the strake 15 or each of the strakes 15 that blocks the downwash is dominant in the magnitude of the force in the right direction generated by the strake 15 or the strakes 15. Accordingly, the optimization target may be limited to the height of the strake 15 or each of the strakes 15 in order to simplify calculations.

In that case, the position and length of the strake 15 or each of the strakes 15 can be determined by CFD analysis simulations, wind tunnel tests, or the like to an appropriate position and length where the effect of blocking the downwash from the main rotor 3 on the left side of the helicopter 1 can be confirmed. In addition, the length of the strake 15 or each of the strakes 15 can be determined to a desired length by considering the balance between the weight and the effect of blocking the downwash. More specifically, when it is important to reduce the weight of the helicopter 1, the length of the strake 15 or each of the strakes 15 can be shortened. Conversely, when the effect of blocking the downwash is important, the length of the strake 15 or each of the strakes 15 can be increased like an example illustrated in FIG. 1 where the strake 15 is extended over a range not less than 70% of the length of the tail boom 5.

When the amount of variation in the magnitude of the force in the right direction generated by the strake 15 or the strakes 15 is minimized, the amount of variation in the magnitude of the force in the right direction to be generated by the tail rotor 4 is also inevitably minimized regardless of which of the position, length and height of the strake 15 or each of the strakes 15 is optimized. Therefore, an optimization calculation whose target to be minimized is the amount of variation in the magnitude of the force in the right direction generated by the strake 15 or the strakes 15 is equivalent to an optimization calculation whose target to be minimized is the amount of variation in the magnitude of the force in the right direction to be generated by the tail rotor 4.

(Method of Repairing Vertical Tail of Helicopter)

Next, an example of a method of repairing a vertical tail of an existing helicopter to produce the above-mentioned helicopter 1 having the vertical tail 6 will be described.

Figure 9:
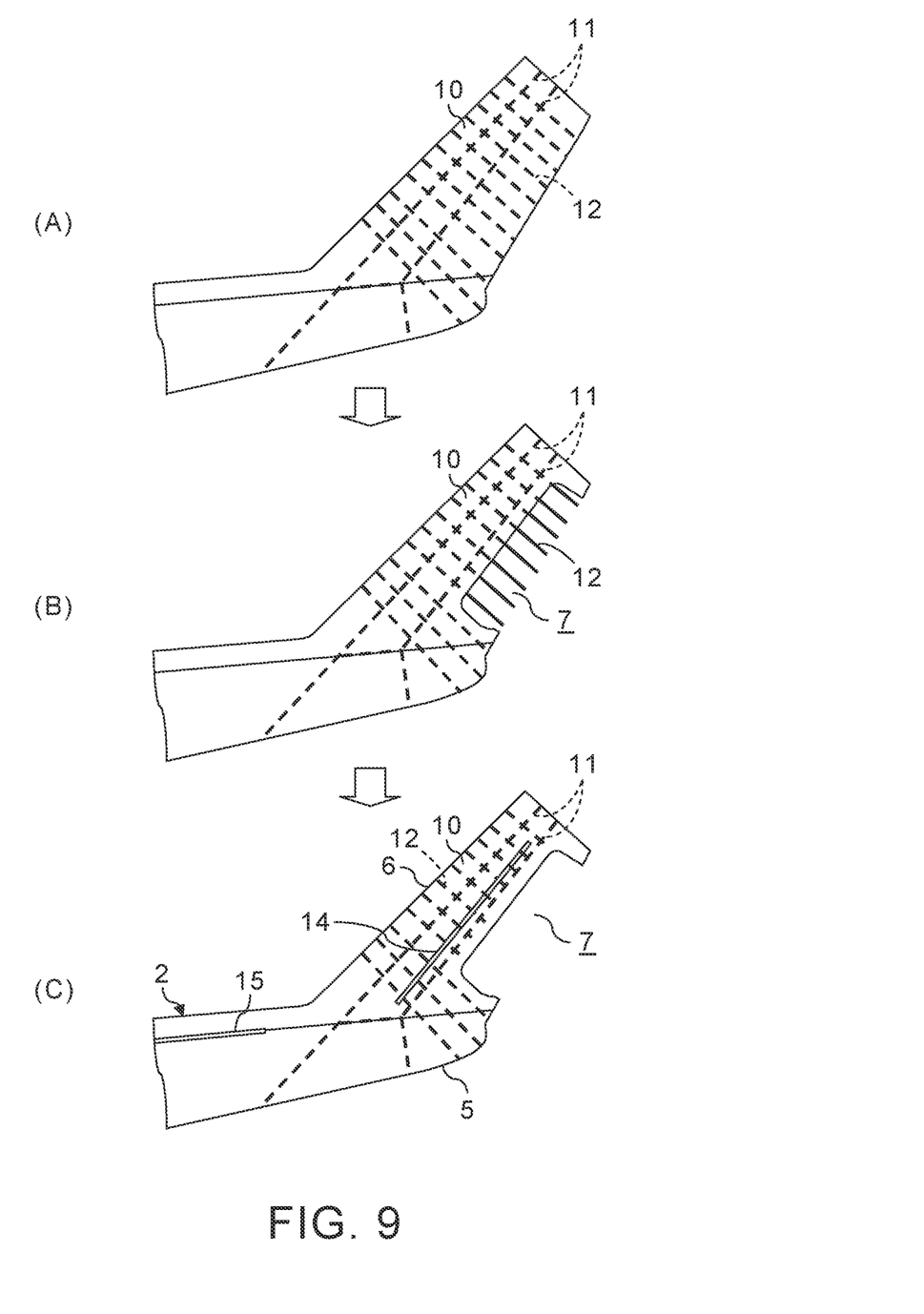
FIG. 9 explains an example of a method of repairing a vertical tail of an existing helicopter to form the notch.

FIG. 9 explains an example of a method of repairing a vertical tail of an existing helicopter to form the notch 7.

The vertical tail of an existing helicopter without the notch 7 has a box structure in which the left and right skins 10 are reinforced with the spars 11 and the ribs 12, as shown in (A) of FIG. 9. When the notch 7 is to be formed in the vertical tail while ensuring the strength of the vertical tail having such a structure, it is important not to cut any of the spars 11 included in the vertical tail, as described above.

Therefore, in order to form the notch 7 in the existing vertical tail, it is necessary to determine the depth of the notch 7 to be formed in the vertical tail so that any of the spars 11 may not protrude from the trailing edge of the vertical tail after being cut out, and subsequently cut at least the left and right skins 10 and some of the ribs 12.

When a cutting tool is moved along the contour of the notch 7 in order to trim the left and right skins 10, the cutting tool advances in the thickness direction of each rib 12. Therefore, cutting the ribs 12 together with the left and right skins 10 in one trim process is a difficult cutting process whose cutting resistance increases and decreases greatly, by which each rib 12 is highly likely to deform in the thickness direction.

Accordingly, it is realistic to trim the left and right skins 10 separately one by one using a desired cutting tool, such as an end mill or a saw exemplified by a jigsaw or an electric circular saw, prior to cutting the ribs 12. Depending on a cutting tool used, the cutting depth of the cutting tool in the thickness direction of the skin 10 may be made shallow and the cutting tool may be moved multiple times along the contour of the notch 7, or alternatively the cutting depth of the cutting tool in the thickness direction of the skin 10 may be made not less than the thickness of the skin 10 and the skin 10 may be cut in one trimming process.

On the trailing edge side of the vertical tail of a helicopter, the distance between the left and right skins 10 gradually narrows and eventually the left and right skins 10 are bonded to each other, or the gap formed between the left and right skins 10 is occluded by h a conventional convex trailing edge cover having a wing shape. Accordingly, when the trailing edge cover is attached, the trailing edge cover is also trimmed similarly to the left and right skins 10.

When the trimming of the left and right skins 10 is completed, some of the ribs 12 protrude and remain in the notch 7, as shown in (B) of FIG. 9. Therefore, in order to completely form the notch 7 on the trailing edge side of the vertical tail, it is necessary to cut the protruding ribs 12. Accordingly, the ribs 12 each protruding into the notch 7 are cut out. More specifically, the ribs 12, which protrude from the notched trailing edge of the vertical tail unless the ribs 12 are cut out, among the ribs 12 included in the vertical tail before the trailing edge side of the vertical tail is notched are cut out.

In order to secure a sufficient working space so that the trailing edge cover 13 can be easily attached to the inner surfaces of the left and right trimmed skins 10 while certainly avoiding interference between each rib 12 cut out and the trailing edge cover 13, as illustrated in FIG. 7, it is important to cut each rib 12 protruding into the notch 7 so that each protruding rib 12 may become sufficiently short and eventually the tip of each rib 12 may be located on the leading edge side of the outline of the notch 7 formed in the vertical tail, more preferably near the spar 11 on the trailing edge side of the vertical tail.

Accordingly, each rib 12 can be cut with a desired cutting tool, such as a saw or an end mill, so that the tip of each rib 12 to be cut remaining in the notch 7 may become located at least on the leading edge side of the outline of the notch 7 formed in the vertical tail, more preferably near the spar 11 on the trailing edge side of the vertical tail. In other words, the end portions of the ribs 12 on the trailing edge side of the vertical tail can be cut so that a sufficient gap as illustrated in FIG. 7 may be formed between the attached trailing edge cover 13 and each of the cut ribs 12.

When a cutting tool used interferes with at least one of the left and right skins 10 or when the cutting resistance becomes large, each rib 12 may be once cut so as to match the outline of the notch 7 and subsequently cut further shorter. In any case, each rib 12 can be cut by moving a cutting tool in a direction intersecting the thickness direction of each rib 12, such as a direction almost perpendicular to the thickness direction, since the trim processing of the left and right skins 10 has already been completed.

When the cutting of the target ribs 12 is completed, at least a portion on the trailing edge side of the vertical tail of an existing helicopter can be completely cut away toward the leading edge side, as shown in (C) of FIG. 9. The notched trailing edge of the vertical tail has an opening. Accordingly, the cover 13 is attached to the opening formed at the trailing edge of the vertical tail to occlude the opening. Thereby, the vertical tail 6 and the helicopter 1 having the vertical tail 6 as illustrated in FIG. 1 to FIG. 7 can be produced.

As a more specific example, the cover 13 can be attached to the inner surfaces of the left and right skins 10 included in the notched vertical tail 6 with shape materials, such as the angle members 13B, as illustrated in FIG. 7. In particular, attaching the spoilers 14 to the left and right wing surfaces of the vertical tail 6 as shown in (C) of FIG. 9 allows composing the cover 13 of the flat plate 13A since the generation of vortices on the trailing edge side of the vertical tail 6 can be suppressed, as mentioned above. Composing the cover 13 of the flat plate 13A allows attaching the cover 13 so as not to protrude on the trailing edge side of the notched vertical tail 6.

Furthermore, the strake 15 or the strakes 15 may be attached to the tail boom 5 as shown in (C) of FIG. 9 as a modification of the helicopter independent of the above-mentioned modification of the vertical tail. In that case, the position, length and height of the strake 15 or each of the strakes 15 can be optimized by simulation including CFD analysis so that the amount of variation in the magnitude of the force in the right direction generated by the strake 15 or the strakes 15 may be reduced, as mentioned above.

(Effects)

As described above, the helicopter 1 includes the vertical tail 6 having the notch 7 on the trailing edge side, preferably limited to an overlapping region with the tail rotor 4, so that the portion of the vertical tail 6 that blocks the side wash from the tail rotor 4 can be reduced, and thereby the anti-torque generated by the tail rotor 4 can be improved. In addition, the spoilers 14 are attached to the vertical tail 6 to suppress vortices on the trailing edge side of the vertical tail 6 so that the flat plate 13A that does not protrude into the notch 7 can be used as the cover 13 forming the portion of the trailing edge of the vertical tail 6 where the notch 7 is formed.

Accordingly, the energy required to generate anti-torque by the tail rotor 4 of the helicopter 1 can be reduced. As a result, the hovering performance of the helicopter 1 and a rudder margin when the helicopter 1 moves laterally to the right can be improved.

(Second Implementation)

Figure 10:
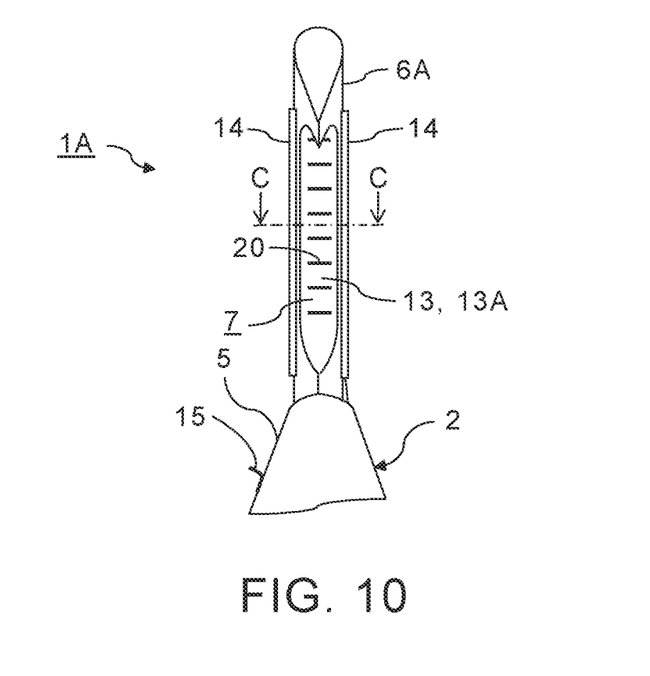
FIG. 10 shows a vertical tail of a helicopter according to the second implementation of the present invention, as viewed from the trailing edge side.
Figure 11:
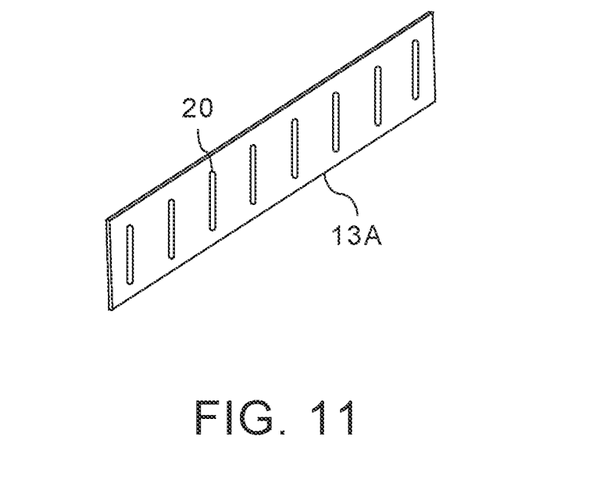
FIG. 11 is a perspective view of a cover on the trailing edge side of the vertical tail shown in FIG. 10.
Figure 12:
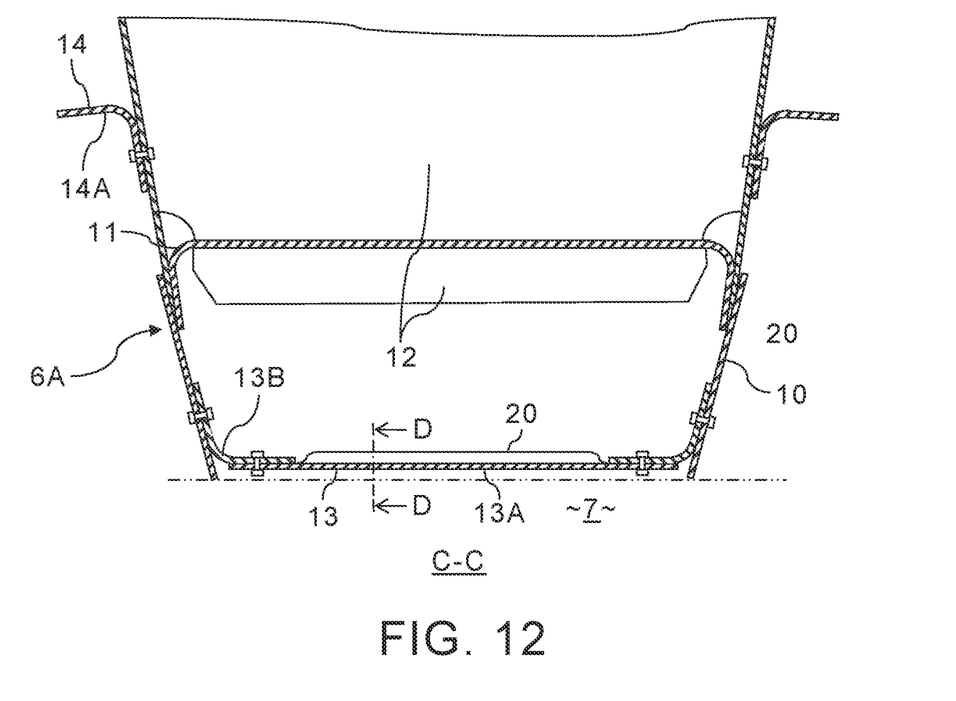
FIG. 12 is an enlarged partial sectional view of the vertical tail shown in FIG. 10 at the position C-C.
Figure 13:
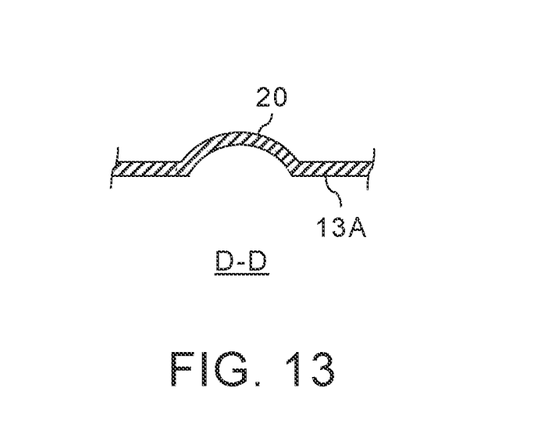
FIG. 13 is an enlarged partial sectional view of the cover on the trailing edge side of the vertical tail shown in FIG. 12 at the position D-D.

FIG. 10 shows a vertical tail of a helicopter according to the second implementation of the present invention, as viewed from the trailing edge side. FIG. 11 is a perspective view of a cover on the trailing edge side of the vertical tail shown in FIG. 10. FIG. 12 is an enlarged partial sectional view of the vertical tail shown in FIG. 10 at the position C-C. FIG. 13 is an enlarged partial sectional view of the cover on the trailing edge side of the vertical tail shown in FIG. 12 at the position D-D.

A helicopter 1A according to the second implementation shown in FIG. 10 differs from the helicopter 1 according to the first implementation in that beads 20 are formed on the flat plate 13A serving as the cover 13 on the trailing edge side of a vertical tail 6A. Other structure and functions of the helicopter 1A in the second implementation are not substantially different from those of the helicopter 1 in the first implementation. Therefore, only the vertical tail 6A is illustrated, and the same elements and the corresponding elements are denoted with the same reference signs while explanations thereof are omitted.

As illustrated in FIG. 10 to FIG. 13, the beads 20 can be formed on the flat plate 13A which is the cover 13 forming the trailing edge of the vertical tail 6A. Each bead 20 is an elongated string-like unevenness formed on a plate material without changing the plate thickness, and more specifically, an unevenness in which one surface is raised while a groove is formed on the other surface. In most cases, the bead 20 is formed by bead processing, which is a kind of press molding.

Forming the beads 20 on the flat plate 13A allows improving the strength of the flat plate 13A without increasing the weight of the flat plate 13A. When the flat plate 13A is fixed to the skins 10 with the angle members 14A as illustrated in FIG. 12, the strength of the flat plate 13A is strengthened by the angle members 14A in the length direction of the angle members 14A. Accordingly, each bead 20 can be formed so that each bead 20 may be recessed toward the leading edge side of the vertical tail 6A and the length direction of each bead 20 may be the thickness direction of the vertical tail 6A, which intersects the length direction of the angle members 14A, as illustrated. In this case, the flat plate 13A can be reinforced in two directions by the beads 20 whose length directions are each the width direction of the flat plate 13A, and the angle members 14A whose length directions are each the length direction of the flat plate 13A.

The strength of the flat plate 13A increases as the number of the beads 20 increases, as the depths of the beads 20 increase, and as the lengths of the beads 20 increase. Meanwhile, the widths of the beads 20 do not contribute much to the strength of the flat plate 13A. On the other hand, the longer the total length of the beads 20 is, the higher the processing cost becomes. Therefore, it is preferable to determine the number, depths, and lengths of the beads 20 so that the strength of the flat plate 13A and the manufacturing cost may be appropriately balanced. Accordingly, the beads 20 are not limited to the illustrated example. For example, the beads 20 may be formed in different directions when the angle materials 14A are not used to fix the flat plate 13A to the skins 10, or when the strength of the flat plate 13A is more important than the manufacturing cost. The surface to be raised may be the outer surface side of the flat plate 13A. When the flat plate 13A is made into a corrugated shape, the strength can be further improved. In this case, it is appropriate to prevent gaps from being formed between the flat plate 13A and each skin 10 that would cause rainwater and the like to enter.

According to the above-mentioned second implementation, it is possible to obtain the effect that the strength of the flat plate 13A forming the cover 13 on the trailing edge side of the vertical tail 6A can be improved without increasing the weight, in addition to effects similar to those in the first implementation.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A vertical tail of a helicopter, the helicopter including a main rotor and a tail rotor for generating anti-torque to cancel torque generated by rotation of the main rotor, the vertical tail comprising:
a leading edge; and
a trailing edge concave toward the leading edge,
wherein the trailing edge is concave only within a range within which the vertical tail overlaps a circular region in a rotation axis direction of the tail rotor,
wherein the circular region is formed as a rotation range of the tail rotor, and
wherein the concave trailing edge is positioned to avoid interference with main reinforcing members, including spars, of the vertical tail to maintain mechanical strength of the vertical tail for supporting the tail rotor.

2. The vertical tail of the helicopter according to claim 1, further including:
spoilers attached to a left side and a right side of the vertical tail respectively, the spoilers suppressing generation of vortices around the concave trailing edge by separating airflow on left and right surfaces of the vertical tail respectively.

3. A helicopter comprising:
the vertical tail according to claim 2.

4. The vertical tail of the helicopter according to claim 1, wherein the concave trailing edge has a cover made of a flat plate, the flat plate being disposed not so as to protrude from the concave trailing edge.

5. The vertical tail of the helicopter according to claim 4, wherein the flat plate has beads concave toward the leading edge, each length direction of the beads being a thickness direction of the vertical tail.

6. A helicopter comprising:
the vertical tail according to claim 5.

7. A helicopter comprising:
the vertical tail according to claim 4.

8. A helicopter comprising:
the vertical tail according to claim 1.

9. A method of producing the vertical tail of the helicopter according to claim 1, the method comprising:
cutting out at least a part, on a trailing edge side, of the vertical tail toward a leading edge side; and
occluding an opening, formed on the trailing edge side of the vertical tail after cutting out the part, by attaching a cover made of a flat plate to the opening.

10. The method according to claim 9, further comprising:
cutting off at least one rib out of ribs included in the vertical tail before the part is cut out, the at least one rib protruding from the trailing edge side of the vertical tail after cutting out the part unless the at least one rib is cut off,
wherein an end portion of the at least one rib on the trailing edge side of the vertical tail is cut off so that a gap is formed between the cover and the at least one rib.

11. The method according to claim 10, wherein the cover is attached to inner surfaces of skins on left and right sides included in the vertical tail after cutting out the part, the cover being attached to the inner surfaces with shape materials not so as to protrude from the trailing edge side of the vertical tail after cutting out the part.

12. The method according to claim 10, wherein the opening is occluded with the cover without cutting off any of spars included in the vertical tail by cutting out the part at a depth at which the any of the spars does not protrude from the trailing edge side of the vertical tail after cutting out the part.

13. The method according to claim 9, wherein the cover is attached to inner surfaces of skins on left and right sides included in the vertical tail after cutting out the part, the cover being attached to the inner surfaces with shape materials not so as to protrude from the trailing edge side of the vertical tail after cutting out the part.

14. The method according to claim 9, wherein the opening is occluded with the cover without cutting off any of spars included in the vertical tail by cutting out the part at a depth at which the any of the spars does not protrude from the trailing edge side of the vertical tail after cutting out the part.

15. A method, using the vertical tail of the helicopter according to claim 1, of improving anti-torque by the tail rotor of the helicopter,
the helicopter comprising:
a main rotor;
the tail rotor for generating the anti-torque to cancel torque generated by rotation of the main rotor; and
a vertical tail having a leading edge and a trailing edge, the tail rotor being attached to a distal portion of the vertical tail,
the method comprising:
improving the anti-torque by decreasing an area of the vertical tail that blocks a jet flow generated from the tail rotor in a rotation axis direction of the tail rotor, the area being decreased by making the trailing edge have a shape cut out so as to be concave only within a range within which the vertical tail overlaps a circular region, formed as a rotation range of the tail rotor, in the rotation axis direction of the tail rotor, the trailing edge being concave toward the leading edge.

16. The method according to claim 15, wherein the anti-torque is further improved by attaching a strake to a left side of a tail boom to which the vertical tail is attached, the strake blocking downwash from the main rotor, the strake making pressure on a left side of the helicopter higher than pressure on a right side of the helicopter, the strake having a height optimized so that an amount of variation in force toward the right side of the helicopter is minimized, the force being generated as a pressure difference between the pressure on the left side of the helicopter higher and the pressure on the right side of the helicopter, the variation in the force arising between a state in which the helicopter is hovering and a state in which the helicopter is moving toward the right side of the helicopter.

17. A vertical tail of a helicopter, the helicopter including a main rotor and a tail rotor for generating anti-torque to cancel torque generated by rotation of the main rotor, the vertical tail comprising:
a leading edge;
a trailing edge concave toward the leading edge; and
spoilers attached to a left side and a right side of the vertical tail respectively, the spoilers suppressing generation of vortices around the concave trailing edge by separating airflow on left and right surfaces of the vertical tail respectively,
wherein the concave trailing edge has a cover made of a flat plate, the flat plate being disposed not so as to protrude from the concave trailing edge, the flat plate being attached to inner surfaces of skins on left and right sides of the vertical tail with shape materials, and the flat plate being positioned to avoid interference with a spar on the trailing edge side of the vertical tail.

18. The vertical tail of the helicopter according to claim 17, wherein the flat plate has beads concave toward the leading edge, each length direction of the beads being a thickness direction of the vertical tail.

19. A vertical tail of a helicopter, the helicopter including a main rotor and a tail rotor for generating anti-torque to cancel torque generated by rotation of the main rotor, the vertical tail comprising:
    a leading edge; and
    a trailing edge concave toward the leading edge,
    wherein the trailing edge is concave only within a range within which the vertical tail overlaps a circular region in a rotation axis direction of the tail rotor,
    wherein the circular region is formed as a rotation range of the tail rotor,
    further including spoilers attached to a left side and a right side of the vertical tail respectively, the spoilers suppressing generation of vortices around the concave trailing edge by separating airflow on left and right surfaces of the vertical tail respectively,
    wherein the spoilers include upright plates that stand out from the left and right surfaces of the vertical tail respectively.

20. A vertical tail of a helicopter, the helicopter including a main rotor and a tail rotor for generating anti-torque to cancel torque generated by rotation of the main rotor, the vertical tail comprising:
    a leading edge; and
    a trailing edge concave toward the leading edge,
    wherein the trailing edge is concave only within a range within which the vertical tail overlaps a circular region in a rotation axis direction of the tail rotor,
    wherein the circular region is formed as a rotation range of the tail rotor,
    wherein the concave trailing edge has a cover made of a flat plate, the flat plate being disposed not so as to protrude from the concave trailing edge,
    wherein the flat plate has beads concave toward the leading edge, each length direction of the beads being a thickness direction of the vertical tail,
    wherein each length of the beads is shorter than a length of the flat plate in a width direction.

* * * * *